(12) United States Patent
Batchik

(10) Patent No.: US 7,545,262 B2
(45) Date of Patent: *Jun. 9, 2009

(54) METHOD AND SYSTEM FOR AUTOMATED RECALL NOTIFICATION

(75) Inventor: Michael G. Batchik, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/292,744

(22) Filed: Dec. 2, 2005

(65) Prior Publication Data

US 2007/0129064 A1    Jun. 7, 2007

(51) Int. Cl.
| | |
|---|---|
| B60Q 1/00 | (2006.01) |
| B60R 25/10 | (2006.01) |
| H04H 20/74 | (2008.01) |
| H04B 7/185 | (2006.01) |
| H04M 3/42 | (2006.01) |
| H04W 24/00 | (2009.01) |
| G01C 21/00 | (2006.01) |

(52) U.S. Cl. ............... 340/438; 340/426.1; 340/426.36; 455/3.02; 455/12.1; 455/415; 455/456.1; 701/213

(58) Field of Classification Search ................ 340/438, 340/426.1, 426.36; 455/414.1, 3.02, 12.1, 455/415, 456.1; 701/213
See application file for complete search history.

(56) References Cited

U.S. PATENT DOCUMENTS

| | | | | |
|---|---|---|---|---|
| 6,611,201 | B1 * | 8/2003 | Bishop et al. | 340/426.21 |
| 6,662,091 | B2 * | 12/2003 | Wilson et al. | 701/33 |
| 2004/0002794 | A1 * | 1/2004 | Pillar et al. | 701/1 |
| 2004/0085195 | A1 * | 5/2004 | McKibbon | 340/426.36 |
| 2004/0093134 | A1 * | 5/2004 | Barber et al. | 701/29 |
| 2004/0192189 | A1 * | 9/2004 | Yuhara et al. | 455/3.02 |
| 2004/0203672 | A1 * | 10/2004 | Crocker et al. | 455/415 |
| 2004/0203919 | A1 * | 10/2004 | Ross et al. | 455/456.1 |
| 2004/0234053 | A1 * | 11/2004 | Reeser | 379/88.22 |
| 2005/0038691 | A1 * | 2/2005 | Babu | 705/9 |
| 2005/0137797 | A1 * | 6/2005 | Oesterling et al. | 701/213 |
| 2005/0216902 | A1 * | 9/2005 | Schaefer | 717/168 |
| 2006/0020477 | A1 * | 1/2006 | Retzbach et al. | 705/1 |
| 2006/0046649 | A1 * | 3/2006 | Videtich | 455/12.1 |
| 2006/0047415 | A1 * | 3/2006 | Groskreutz et al. | 701/201 |

\* cited by examiner

*Primary Examiner*—Daniel Wu
*Assistant Examiner*—Jack Wang

(57) ABSTRACT

A method and system for providing an automated recall notification including receiving a recall communication instruction at a telematics unit from a call center via a wireless connection, initiating a service call to the call center from the telematics unit based on the recall communication instruction and responsive to a mobile vehicle operation, receiving a recall notification at the telematics unit, and sending a recall alert to a subscriber based on the received recall notification. A computer usable medium with suitable computer program code is employed for providing an automated recall notification.

15 Claims, 4 Drawing Sheets

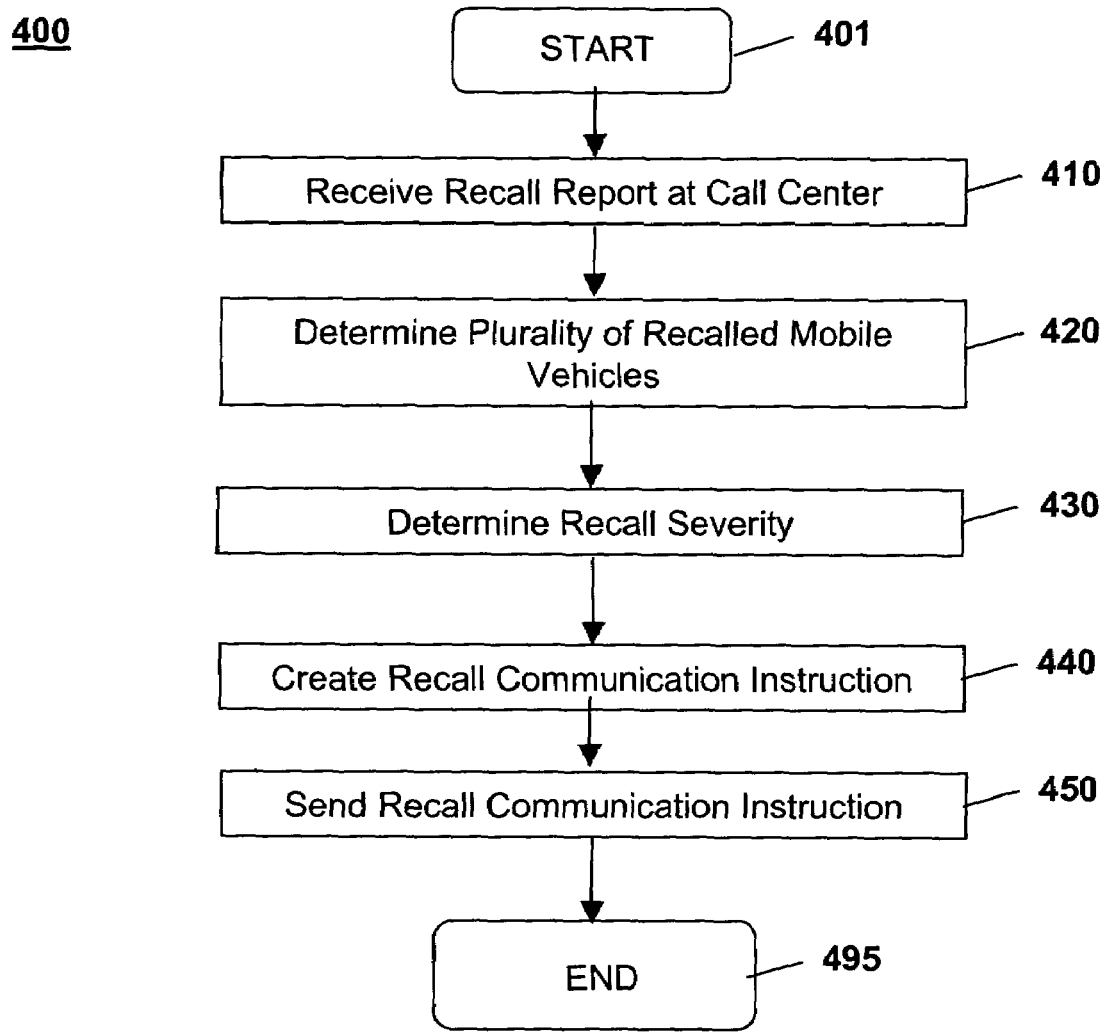

METHOD AND SYSTEM FOR AUTOMATED RECALL NOTIFICATION

FIELD OF THE INVENTION

This invention relates generally to telematics systems. In particular the invention relates to a method and system for providing automated recall notification.

BACKGROUND OF THE INVENTION

Telematics units enable a service provider to communicate with a mobile vehicle without any intervention required by the operator of the mobile vehicle. Telematics units can receive data from and be configured by a remote call center as necessary.

Recall notifications typically are communicated by a letter sent to the mobile vehicle's registered owner. A phone call or email to the registered owner is also used when the recall involves possible damage to the mobile vehicle. In addition, a recall may affect vehicle handling or the operation of a critical system within the vehicle such as the lighting, braking or transmission system. In these situations expedient notification is necessary to alert the owner of the potential problem posed by the recall.

Recall notification is an expensive and time consuming activity. In addition, a mobile vehicle subject to a recall that is not repaired or attended to in a timely manner can be damaged further. This additional damage to the mobile vehicle results in increased repair costs for the manufacturer issuing the recall.

Currently, there is no expeditious method to alert an owner or operator of a mobile vehicle of the recall and potential problems as soon as the recall is identified. A call can be placed to a wireless phone in the vehicle but there is no way to assure that the owner or operator will be in the vehicle to receive the call. Once at the vehicle, the owner or operator may not access phone messages before operating the vehicle and therefore be unaware of potential problems posed by the recall.

It is therefore desirable to provide a method and system for providing an automated recall notification that overcomes the limitations, challenges, and obstacles described above.

SUMMARY OF THE INVENTION

One aspect of the present invention provides a method for providing an automated recall notification including receiving a recall communication instruction at a telematics unit from a call center via a wireless connection, initiating a service call to the call center from the telematics unit based on the recall communication instruction and responsive to a mobile vehicle operation, receiving a recall notification at the telematics unit, and sending a recall alert to a subscriber based on the received recall notification.

Another aspect of the present invention provides a computer readable medium storing a computer program including computer program code for providing an automated recall notification including computer program code for receiving a recall communication instruction at a telematics unit from a call center via a wireless connection, computer program code for initiating a service call to the call center from the telematics unit based on the recall communication instruction and responsive to a mobile vehicle operation, computer program code for receiving a recall notification at the telematics unit, and computer program code for sending a recall alert to a subscriber based on the received recall notification.

A third aspect of the present invention provides a method for determining a recall notification requirement at a call center including receiving a recall report at the call center, determining a plurality of recalled mobile vehicles, determining a recall severity, creating a recall communication instruction based on the recall report, and sending the recall communication instruction to the plurality of affected mobile vehicles via a wireless connection.

The aforementioned and other features and advantages of the invention will become further apparent from the following detailed description of the presently preferred example, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 illustrates a flowchart representative of one example of a method for determining a recall notification requirement, in accordance with the present invention;

DETAILED DESCRIPTION OF THE PRESENTLY PREFERRED EXEMPLARY EMBODIMENTS

Figure 1:
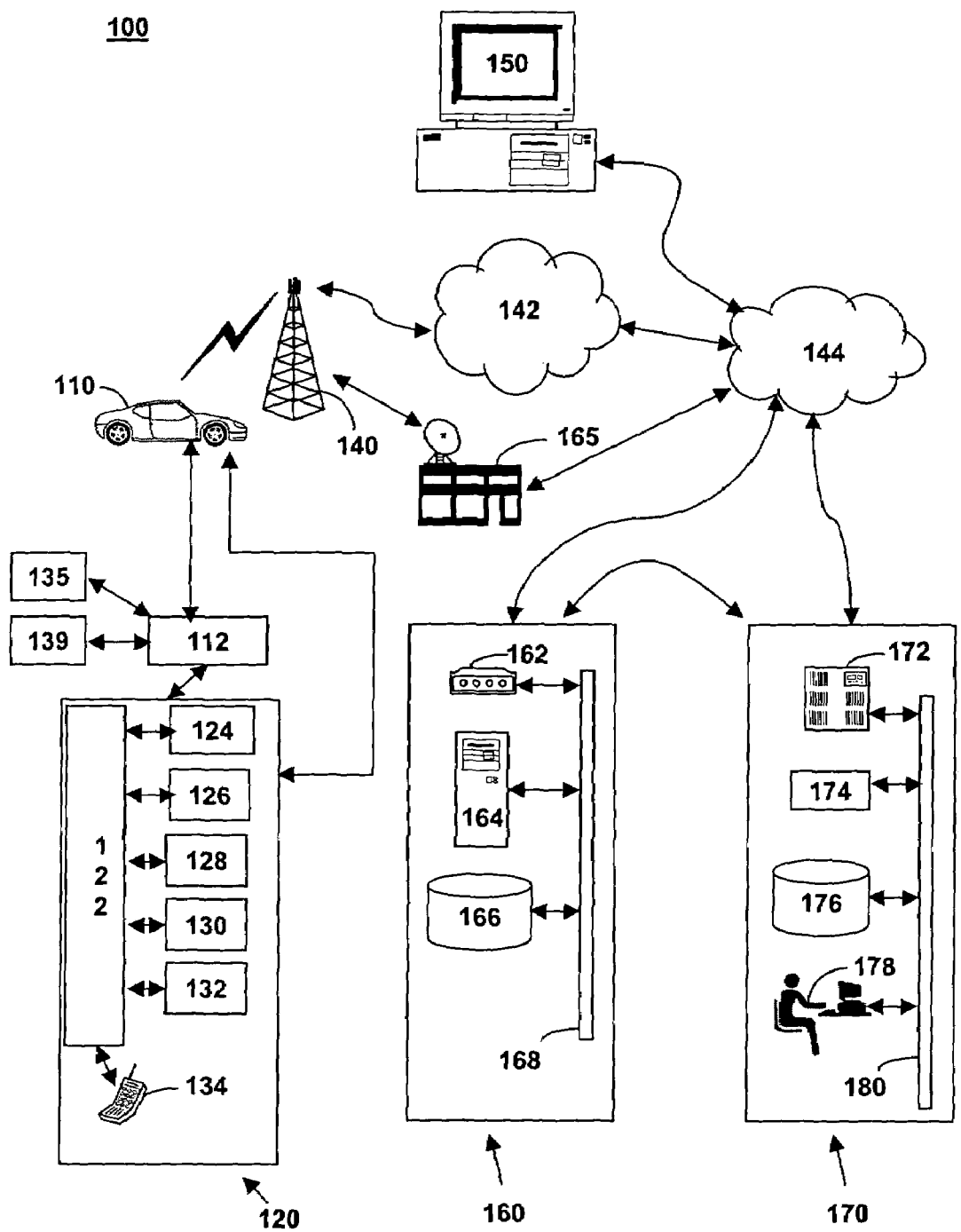
FIG. 1 illustrates one example of a system for providing an automated recall notification, in accordance with the present invention.

FIG. 1 illustrates one example of a system for providing an automated recall notification, in accordance with the present invention at 100. The automated recall notification system includes a mobile vehicle communication unit (MVCU) 110, a mobile vehicle communication network 112, one or more embedded modules 139, a communication device such as a telematics unit 120, one or more wireless carrier systems 140, one or more communication networks 142, one or more land networks 144, one or more client, personal, or user computers 150, one or more web-hosting portals 160, and one or more call centers 170. In one example, MVCU 110 is implemented as a mobile vehicle equipped with suitable hardware and software for transmitting and receiving voice and data communications. In one example, a display 135 such as a digital display in a radio unit or in an instrument panel is embedded in MVCU 110. In other examples, automated recall notification system 100 includes additional components not relevant to the present discussion. Mobile vehicle communication systems and telematics units are known in the art.

Embedded modules 139 are any electronic module configured to enable or assist in the operation of MVCU 110, or any of its included systems. For example, one embedded module performs odometer functions, while another embedded module controls HVAC operations within the mobile vehicle. In another example, an embedded module senses a mobile vehicle operation input, such as a key cycle, and sends a signal via vehicle communication network 112 that is received by telematics unit 120. Any number of embedded modules 139 can be included.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a mobile vehicle communication network 112, sends signals to various units of equipment and systems within mobile vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, mobile vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one example, mobile vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

In one example, telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other examples, telematics unit 120 is implemented without one or more of the above listed components such as, for example, GPS unit 126 or speakers 132 or includes additional components not relevant to the present discussion.

In various examples, processor 122 is implemented as a digital signal processor (DSP), microcontroller, microprocessor, controller, host processor, or vehicle communications processor. In an example, processor 122 is implemented as an application-specific integrated circuit (ASIC). In another example, processor 122 is implemented as a processor working in conjunction with a central processing unit (CPU) performing the function of a general purpose processor. GPS unit 126 provides longitude and latitude coordinates of the mobile vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one example, modem 162 resides inside web server 164. Land network 144 transmits data communications between web-hosting portal 160 and call center 170.

Web server 164 receives user-preference data from user computer 150 via land network 144. In alternative examples, computer 150 includes a wireless modem to send data to web-hosting portal 160 through a wireless communication network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. In one example, web server 164 includes computer applications and files for managing and storing personalization settings supplied by the client and subscriber status supplied by telematics unit 120. For each subscriber, the web server potentially stores hundreds of preferences for wireless vehicle communication, networking, maintenance and diagnostic services for a mobile vehicle.

In one example, one or more web servers 164 are networked via network system 168 to distribute data among its network components such as database 166. In an example, database 166 is a part of or a separate computer from web server 164. Web server 164 sends data transmissions with status information to call center 170 through land network 144.

Call center 170 is a location where many calls are received and serviced at the same time, or where many calls are sent at the same time. In one example, the call center is a test center facilitating communications to mobile vehicle 110 for testing of embedded modules 139. In another example, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other examples, call center 170 and web-hosting portal 160 are located in the same or in different facilities.

In one example, call center 170 receives a recall report and creates a recall communication instruction based on the recall report. Call center 170 then sends recall communication instructions to telematics unit 120 of mobile vehicle 110 involved in a recall.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives requests for a variety of services from the client via computer 150, web-hosting portal 160, and land network 144 and awareness messages from telematics unit 120. Communication services manager 174 transmits requests for subscriber status and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one example, communication services advisor 178 is implemented as a real advisor. In an example, a real advisor is a human being in verbal communication with a user or subscriber (e.g., a client) in MVCU 110 via telematics unit 120. In another example, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, recall notifications navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative example, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

In one example, telematics unit 120 receives recall communication instructions and initiates a service call to a call center in response to a vehicle operation input. Telematics unit 120 also receives a recall notification during the service call and delivers a recall alert through speakers 132 or display 135.

Figure 2:
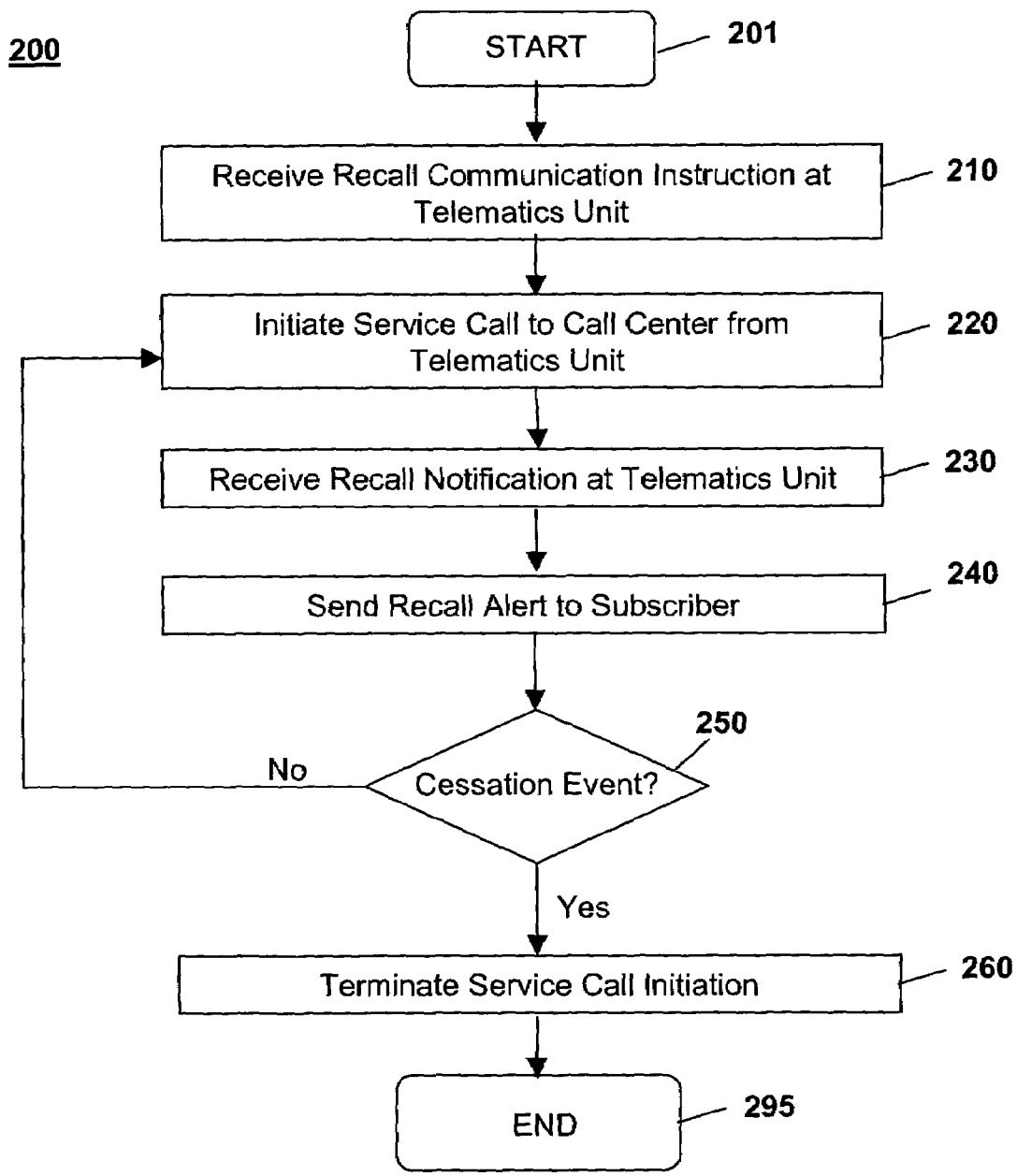
FIG. 2 illustrates a flowchart representative of one example of a method for providing an automated recall notification, in accordance with the present invention.

FIG. 2 illustrates a flowchart 200 representative of one example of a method for providing an automated recall notification, in accordance with the present invention. The automated recall notification is a message sent by a manufacturer concerning a mobile vehicle component that has been identified as defective. The message specifies how, when, and where to return the mobile vehicle, as necessary, for repairs or adjustments. The method begins at 201.

During step 210, the recall communication instruction is received at telematics unit 120 from call center 170 via a wireless connection. The wireless connection is established using wireless carrier system 140. The recall communication instruction sent by the call center directs the telematics unit to initiate an outbound service call to the call center, upon the occurrence of a specific mobile vehicle operation. The recall communication instruction includes information regarding the specific mobile vehicle operation input that prompts initiation of the outbound service call, call center contact information and recall identification information.

The recall communication instruction is sent to and received by the telematics unit without any intervention by the subscriber. Call center 170 or another service facility such as web hosting facility 160 sends the recall communication instruction to the telematics unit of each mobile vehicle involved in the recall.

In one example, the mobile vehicle operation that prompts the initiation of the outbound service call is an ignition cycle. When a subscriber or other user enters the mobile vehicle and turns an ignition key to the "on" position the telematics unit is instructed to initiate the outbound service call. In another example, a mobile vehicle operation, such as a door unlock, a light activation, or a door opening, is used to initiate the outbound service call.

Call center contact information includes the appropriate call center phone number the telematics unit uses when placing the outbound service call. Additional data, such as alternate phone numbers, and call routing information, are also included in the call center contact information.

Recall identification information contains data including but not limited to a mobile vehicle identification number (VIN), a recall identification number, and a recall severity extent.

The outbound service call is used to deliver a recall notification to the telematics unit in the mobile vehicle and subsequently to deliver a recall alert to a subscriber via the telematics unit.

During step 220, an outbound service call from the telematics unit to the call center is initiated. The outbound service call is initiated based on the recall communication instruction from step 210 and occurs in response to the mobile vehicle operation input identified in the recall communication instruction.

During step 230, a recall notification is received at the telematics unit. In one example the recall notification is an automated or pre-recorded instruction delivered to the telematics unit by a virtual advisor. In another example, the recall notification is an instruction delivered to the telematics unit by a real advisor directly interacting with the telematics unit. The recall notification includes the information to be communicated to the subscriber, including a recall purpose, the component or components of the mobile vehicle that are affected, and the action required by the subscriber for obtaining repairs. The subscriber is the owner, operator, or other user of the telematics equipped mobile vehicle.

During step 240, a recall alert based on the recall notification is sent to the subscriber. The recall alert includes the information received at the telematics unit via the recall notification. That information includes: the recall purpose which informs the subscriber of the reason for the recall and why the recall is necessary; which component or components are subject to the recall and any potential problems related to the recall of each component; and the action required by the subscriber to repair or replace the components including where to bring the mobile vehicle, when the repair can be completed, and what alternate options are available for repairs. In one example, the recall alert is a live interaction with the call center advisor 178. In another example, the recall alert is a pre-recorded audio message played through speakers 132. In another example, the recall alert is a visual message shown on display 135.

Steps 220, 230 and 240 will repeat, as shown at block 250, until a cessation event, such as a request made by the subscriber, a recall repair, or a timeout occurs. Repetition of the service call initiation and the subscriber alert delivery increases the likelihood that the recall alert is received and acknowledged by the subscriber. Additionally, the call center can maintain a record of the recall, the recall notification, repairs completed as required by the recall, and subscriber acknowledgment of the recall alert.

Repetition of the service call initiation terminates based on occurrence of the cessation event as shown at block 260. During step 295, method 200 terminates.

Figure 3:
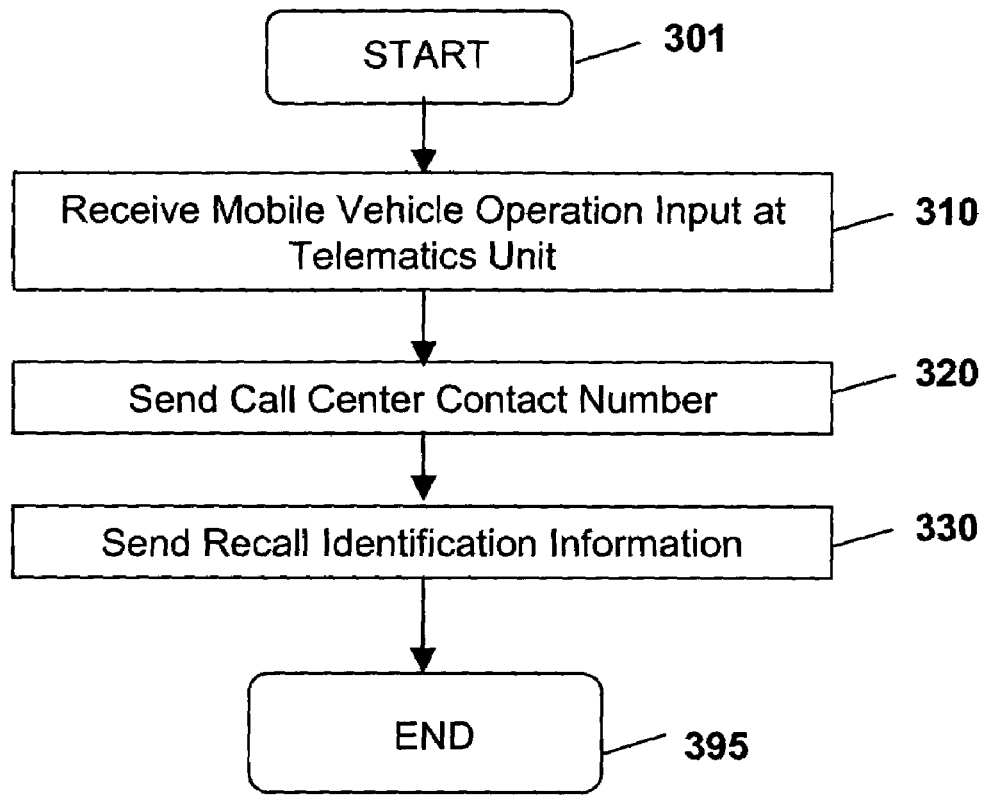
FIG. 3 illustrates a flowchart representative of one example of the step of initiating the service call to the call center, in accordance with the present invention.

FIG. 3 illustrates a flowchart 300 of one example of the step of initiating the service call to the call center. The step detail starts at 301.

During step 310, the mobile vehicle operation input is received at the telematics unit. Telematics unit 120 receives a signal via mobile vehicle communication network 112. An embedded module 139 that controls the specified mobile vehicle operation generates the signal. The particular mobile vehicle operation input expected at the telematics unit is specified in the recall communication instruction previously received from the call center.

During step 320, a call center contact number is sent to establish a wireless connection to call center 170. The call center contact number is also specified in the recall communication instruction, in one example. In other examples, the call center contact number is a predetermined number that is hard coded in memory accessible to the telematics unit 120.

During step 330, recall identification information is sent responsive to a successful call connection. The recall identification information sent is specified in the recall communication instruction and allows the call center to determine information, such as the identity of the mobile vehicle initiating the connection, the location of the mobile vehicle, and a current status of the mobile vehicle. Method 300 terminates in step 395.

FIG. 4 illustrates a flowchart 400 of one example a method for determining a recall notification requirement. Once the need for a recall is established, the mobile vehicles that are to receive the recall communication instruction must be identified. The method 400 starts at 401.

During step 410, a recall report is received at a call center. In one example, the call center manages contact with telematics equipped mobile vehicles. For example, the manufacturer of the mobile vehicle generates a recall report to disseminate information about the recall. The recall report contains specific details pertaining to the recall including the information that needs to be provided to the subscriber in the recall alert. Necessary details include identification of the mobile vehicles involved in the recall, the reason for the recall, the implications of the recall on the mobile vehicles involved, contact information, and instructions for obtaining repairs related to the recall.

During step 420, a plurality of recalled mobile vehicles is determined based on the recall report. In one example, the recall report includes the VINs of those mobile vehicles affected by the recall. The call center then determines the mobile vehicles contained in the recall report that are equipped with active telematics subscriptions. The call center is then capable of contacting those recalled mobile vehicles with active telematics subscriptions. In one example, the determination results from a comparison of the recall report with a database comprising the VINs for a plurality of vehicles.

During step 430, a recall severity is determined. In one example, the recall severity is contained in the recall report. In one example, only recalls with a recall severity that requires immediate action by the owner or operator need to be communicated via the wireless connection. For example, a recall that involves a component that can cause engine damage will have an extreme severity that requires immediate action. In contrast, a recall that involves a defective radio can be communicated via a letter, an email or a phone call. In another example, the recall is communicated to all mobile vehicles with active telematics subscriptions regardless of the recall severity. In one example, the call center receives an acknowledgment of receipt of the recall notification. Recall notification through the telematics unit provides an efficient and expedient method of disseminating recall notifications to telematics equipped mobile vehicles.

During step 440, the recall communication instruction is created based on the recall report. The recall report includes the information necessary for the call center to create the recall communication instruction. The recall communication instruction contains instructions for the telematics unit as discussed above in step 220.

During step 450, the call center sends the recall communication instruction to the telematics unit in each of the mobile vehicles subject to the recall. Method 400 terminates during step 495.

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing an automated recall notification, the method comprising in order: first receiving a recall communication instruction at a telematics unit from a call center via a wireless connection; next determining whether a qualifying vehicle operational event has occurred; if a qualifying vehicle operational event has occurred, initiating a service call to the call center from the telematics unit based on the recall communication instruction without user intervention; in response to the service call from the telematics unit to the call center, receiving a recall notification at the telematics unit; and then providing a recall alert to a vehicle user based on the received recall notification.

2. The method of claim 1 wherein the recall communication instruction includes: a mobile vehicle operation; call center contact information and recall identification information.

3. The method of claim 1 wherein the recall notification comprises an interaction between a real call center advisor and the telematics unit.

4. The method of claim 1 wherein the recall notification comprises an interaction between a virtual call center advisor and the telematics unit.

5. The method of claim 1 wherein the recall alert includes: an identification of a recall purpose; an identification of at least one mobile vehicle component; and an identification of an action required.

6. The method of claim 1 wherein the qualifying vehicle operational event operation is a key cycle.

7. The method of claim 1 wherein initiating the service call to the call center comprises: receiving an indication of the qualifying vehicle operational event at the telematics unit; sending a call center contact number; and sending a recall identification information responsive to a successful call connection.

8. The method of claim 1 further comprising: repeating the service call initiation at each occurrence of the qualifying vehicle operational event until occurrence of a cessation event; and terminating the service call initiation responsive to the cessation event.

9. The method of claim 8 wherein the cessation event is at least one of a subscriber request, a recall repair, and a time-out.

10. A computer readable medium having thereon computer executable instructions for automated recall notification, the instructions comprising: instructions for receiving a recall communication instruction at a telematics unit from a call center via a wireless connection; instructions for determining whether a qualifying vehicle operational event has occurred; instructions for initiating a service call to the call center from the telematics unit based on the recall communication instruction without user intervention if a qualifying vehicle operational event has occurred; instructions for receiving a recall notification at the telematics unit in response to the service call from the telematics unit to the call center; and instructions for providing a recall alert to a vehicle user based on the received recall notification.

11. The computer readable medium of claim 10 wherein the recall communication instruction includes: a mobile vehicle operation; a call center contact information; and a recall identification information.

12. The computer readable medium of claim 10 wherein the recall notification comprises an interaction between a real call center advisor and the telematics unit.

13. The computer readable medium of claim 10 wherein the recall alert includes: a recall purpose; at least one mobile vehicle component; and an action required.

14. The computer readable medium of claim 10 wherein the instructions for initiating the service call to the call center comprise: instructions for receiving an indication of the qualifying vehicle operational event at the telematics unit; instructions for sending a call center contact number; and instructions for sending recall identification information responsive to a successful call connection.

15. The computer readable medium of claim 10 further comprising instructions for repeating the service call at each instance of the qualifying vehicle operational event until occurrence of a cessation event; and instructions for terminating the service call initiation responsive to the cessation event.

* * * * *